United States Patent [19]

Morris et al.

[11] Patent Number: 5,081,220

[45] Date of Patent: Jan. 14, 1992

[54] COPOLYESTERS OF 4,4'-BIPHENYLDICARBOXYLIC ACID, 1,4-BUTANEDIOL AND ETHYLENE GLYCOL

[75] Inventors: John C. Morris; Winston J. Jackson, Jr., both of Kingsport, Tenn.

[73] Assignee: Eastman Kodak Company, Rochester, N.Y.

[21] Appl. No.: 315,649

[22] Filed: Feb. 27, 1989

[51] Int. Cl.$^5$ ............................................. C08G 63/02
[52] U.S. Cl. ................................ 528/272; 528/298; 528/300; 528/302; 528/305; 528/308; 528/308.6; 525/419; 525/437; 264/176.1; 264/177.13; 264/209.1; 264/210.7; 264/219
[58] Field of Search ............... 528/272, 298, 300, 302, 528/305, 308, 308.6; 525/419, 437; 264/176.1, 177.13, 209.1, 210.7, 219

[56] References Cited

U.S. PATENT DOCUMENTS 2,976,266  3/1961  Lytton et al. ..................... 528/280
3,909,489  9/1975  Callander ............................ 524/405
4,728,717  3/1988  Morris et al. ....................... 528/306

OTHER PUBLICATIONS

Derwent Abstract No. 3146136 for JP 57198726A.
Derwent Abstract No. 321518 for JP 61236821A.
Meurisse et al., British Polymer Journal, vol. 13, 1981, p. 57.
Jackson et al., Journal of Applied Polymer Science, Applied Polymer Symposia, 41, 307–326 (1985).

*Primary Examiner*—John Kight, III
*Assistant Examiner*—Sam A. Acquah
*Attorney, Agent, or Firm*—J. Frederick Thomsen; William P. Heath, Jr.

[57] ABSTRACT

Disclosed are polyesters comprised primarily of residues of 4,4'-biphenyldicarboxylic acid, ethylene glycol and 1,4-butanediol. Articles injection-molded from the polyesters exhibit a unique combination of properties including unusually high tensile strength and excellent heat resistance, flexural modulus and resistance to chemicals and solvents.

17 Claims, No Drawings

COPOLYESTERS OF 4,4'-BIPHENYLDICARBOXYLIC ACID, 1,4-BUTANEDIOL AND ETHYLENE GLYCOL

This invention concerns certain novel, melt-processable polyesters comprised primarily of residues of 4,4'-biphenyldicarboxylic acid, ethylene glycol and 1,4-butanediol. Articles injection-molded from the polyesters exhibit a unique combination of properties including unusually high tensile strength, heat resistance, and flexural modulus and excellent resistance to chemicals and solvents.

Polyesters derived from 4,4'-biphenyldicarboxylic acid and various aliphatic diols have been described generally in the literature. Polyesters comprised of residues of 4,4'-biphenyldicarboxylic acid, ethylene glycol, 1,4-butanediol and 1,6-hexanediol are disclosed by Meurisse et al, in the British Polymer Journal, 13, 57 (1981). Jackson and Morris reviewed polyesters comprised of residues of 4,4'-biphenyldicarboxylic acid and various aliphatic diols in the Journal of Applied Polymer Science, Applied Polymer Symposia, 41, 307–326 (1985). Krigbaum et al, Journal of Applied Polymer Science, Polymer Letters Edition, 20, 109–115 (1982) disclose relatively low molecular weight polyesters comprised of 4,4'-biphenyldicarboxylic acid residues and residues derived from one of several aliphatic diols.

Polyesters containing residues of 4,4'-biphenyldicarboxylic acid also are disclosed in Macromolecules, 21(1), 278–280 (1988); Polymer, 24(10), 1299–1307 (1983); Japanese Published Patent Applications (Kokai) 61-236,821 and 57-198,726; Kobunshi Ronbunshu, 44-(12), 983–986 (December 1987) and U.S. Pat. Nos. 2,967,266, 3,842,040, and 3,842,041. German Offenlegungsschrift 1,935,252 discloses polyesters comprised of the residues of at least two diacids such as terephthalic acid and 4,4'-biphenyldicarboxylic acid and two diols such as ethylene glycol and 1,4-cyclohexanedimethanol. These known polyesters typically have inherent viscosities less than about 1.2 and contain 4,4'-biphenyldicarboxylic acid residues and usually residues of at least one additional diacid and residues of at least two diols. U.S. Pat. No. 4,742,151 describes generally ultra-high molecular weight polyesters having inherent viscosities greater than 1.5 comprised of diacid residues of aromatic dicarboxylic acids and diol residues of alkylene glycols of 2 to 6 carbon atoms.

The polyesters of the present invention have an inherent viscosity of at least 0.6 dl/g determined at 25° C. using 0.1 g of polyester per 100 mL of a solvent consisting of 25 parts by weight phenol, 35 parts by weight tetrachloroethane and 40 parts by weight p-chlorophenol and contain the following components:

A. dicarboxylic acid residues consisting of at least 80 mole percent of residues having the structure:

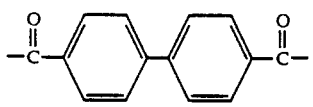

B. diol residues consisting of at least 90 mole percent of residues having the structure:
   (1) —OCH$_2$CH$_2$O— and
   (2) —OCH$_2$CH$_2$CH$_2$CH$_2$O— and, optionally, C. dicarboxylic acid and/or diol residues, i.e., dicarboxylic acid residues, diol residues or mixtures thereof, other than components A and B, wherein the mole ratio of B(1):B(2) is about 3:1 to 0.45:1. The mole percent values set forth above are based on a total of dicarboxylic acid and diol residues of 200 percent in which the mole ratio of dicarboxylic acid residues to diol residues is 1:1, i.e., alternating repeating units of diacid and diol residues.

Articles injection-molded from the polyesters of our invention possess a unique combination of high tensile strength, heat resistance, and flexural modulus. For example, an article injection-molded from a polyester consisting only of 4,4'-biphenyldicarboxylic acid and 1,4-butanediol residues gave a tensile strength of approximately 9,800 psi. The polyester consisting only of 4,4'-biphenyldicarboxylic acid and ethylene glycol residues melts at such a high temperature that it cannot be molded without encountering severe decomposition problems. We have found that certain of the polyesters provided by this invention can be prepared in the melt and that articles injection-molded therefrom exhibit a 2- to 3-fold increase in tensile strength, e.g., ASTM D638 tensile strengths in the range of about 20,000 to 30,000 psi, when compared to polyester derived only from 4,4'-biphenyldicarboxylic acid and 1,4-butanediol.

The polyesters of this invention are prepared by methods generally known in the art for preparing high molecular weight polyesters by polymerizing one or more dicarboxylic acids and two or more diols, as specified hereinabove. The polyesters may be produced by direct condensation or ester interchange in the melt or in the solid phase or by a combination of these processes.

The 4,4'-biphenyldicarboxylic acid residues may be derived from the free acid or from esters such as dimethyl, diethyl, dibutyl, diphenyl, di(2-hydroxyethyl)- or di(4-hydroxybutyl)-4,4'-biphenyldicarboxylate or mixtures of such esters. Up to 20 mole percent, preferably up to 10 mole percent, of the dicarboxylic acid residues of component A may consist of another aromatic dicarboxylic acid such as terephthalic acid, isophthalic acid, 1,5-, 2,6- and 2,7-naphthalenedicarboxylic acid and trans-4,4'-stilbenedicarboxylic acid. Preferably, 100 mole percent of dicarboxylic acid component A consists of 4,4'-biphenyldicarboxylic acid residues.

A portion, e.g., up to 10 mole percent, of diol component B may consist of residues derived from diols other than ethylene glycol and 1,4-butanediol. Examples of such diols include alkylene glycols containing 3 to about 8 carbon atoms such as 1,2- and 1,3-propanediol, 1,5-pentanediol, 1,6-hexanediol, 1,4-cyclohexanedimethanol (cis, trans or mixed isomers) and the like and bis-hydroxyalkylbenzene compounds such as p-xylylene glycol. Normally, 100 mole percent of diol component B will consist of a combination of only the residues of ethylene glycol and 1,4-butanediol. The mole ratio of the ethylene glycol residues to 1,4-butanediol residues may be in the range of about 3:1 to 0.45:1, with the range of about 3:1 to 1.5:1 being particularly preferred. Thus, when the diol residues of our novel polyesters consist only of residues of ethylene glycol and 1,4-butanediol, about 25 to 70 mole percent, preferably 25 to 40 mole percent, of the diol residues consist of 1,4-butanediol residues.

The polyesters of our invention which are especially preferred have an inherent viscosity of at least 0.8 dl/g and consist of at least 95 mole percent of components A and B as defined hereinabove. The most preferred polyesters consist only of components A and B.

Our novel polyesters and the synthesis thereof are further illustrated by the following examples.

PROCEDURE

The polyesters were prepared by reacting dimethyl 4,4'-biphenyldicarboxylate with varying amounts of ethylene glycol and 1,4-butanediol in the presence of titanium tetraisopropoxide at elevated temperatures using reduced pressures for the final polycondensation. The apparatus employed consisted of a 1-L flask equipped with an inlet for nitrogen, a metal stirrer and a short distillation column. Thus, in Example 1, 216.0 g (0.80 mole) dimethyl 4,4'-biphenyldicarboxylate, 148.8 g (2.40 moles) ethylene glycol, 35.0 g (0.40 mole) 1,4-butanediol and 0.15 g titanium tetraisopropoxide were heated at 190° C. for about 3 hours and at 220° C. for 1 hour and then the temperature was raised to 300° C. for about 10 minutes. A vacuum of 0.5 mm Hg was applied gradually over the next 5 minutes and a full vacuum was maintained at a temperature of 300° C. for about 18 minutes. The white, crystalline polymer was allowed to solidify in the flask and then was reheated to pull the polymer away from the glass flask. The polymer was allowed to solidify again and was recovered by breaking the flask and chiseling it from the stirrer. In Examples 6 and 7 and Comparative Examples C-1, C-2 and C-3, the polyesters solidified in the melt during their preparation. The solidified polymers were ground to pass a 3-mm screen and the ground polymers were solid state polymerized at 100° C. for 1 hour and then at 230° C. for 3 hours.

The content of the diol residues, determined by proton nuclear magnetic resonance spectroscopy, and the inherent viscosities (I.V., dl/g), determined at 25° C. using 0.1 g of polyester per 100 mL of a solvent consisting of 25 parts by weight phenol, 35 parts by weight tetrachloroethane and 40 parts by weight p-chlorophenol, of the polyesters prepared in Examples 1-7 and Comparative Examples C-1, C-2 and C-3 are set forth in Table I. Diol residue contents are given as mole percent ethylene glycol residues (EG) and mole percent 1,4-butanediol residues (BD). The polyester of Comparative Example 1 was prepared from only dimethyl 4,4'-biphenyldicarboxylate and 1,4-butanediol.

The polyesters of the above examples were ground to pass a 3-mm screen, dried at 100° C. in a vacuum oven for 24 hours and injection-molded into 0.0625 inch-thick ASTM Type L tensile bars and 0.5×5.0×0.125 inch-thick flexure bars using a 1-ounce Watson-Stillman plunger-type molding machine. The tensile strength ($10^3$ psi, ASTM D638), flexural modulus ($10^5$ psi, ASTM D790) and the heat deflection temperature (HDT, °C. at 264 psi stress) were determined for each of the polyesters and the values are set forth in Table II. The inherent viscosities (I.V., dl/g) for the polyesters of Examples 1-5 and Comparative Example C-1 after molding also are set forth in Table II. The molding temperature (°C.) given in Table II for each polyester is the temperature of the nozzle on the molding machine. The barrel temperature of the molding machine is about 15° C. above the nozzle temperature. Due to its high melting temperature, the polyester of Comparative Example C-1 was molded with difficulty.

TABLE I

| Example | EG | BD | I.V. |
|---|---|---|---|
| 1 | 71 | 29 | 0.87 |
| 2 | 73 | 27 | 1.05 |
| 3 | 65 | 35 | 0.95 |
| 4 | 63 | 37 | 0.84 |
| 5 | 63 | 37 | 0.89 |
| 6 | 55 | 45 | 1.43 |
| 7 | 50 | 50 | 1.17 |
| C-1 | 0 | 100 | 1.27 |
| C-2 | 79 | 21 | 1.02 |
| C-3 | 27 | 73 | 1.11 |

TABLE II

| Example | Molding Temp. | I.V. | Tensile Strength | HDT | Flexural Modulus |
|---|---|---|---|---|---|
| 1 | 295 | 0.83 | 21.9 | 236 | 12.2 |
| 2 | 310 | 0.92 | 39.5 | 234 | 12.8 |
| 3 | 290 | 0.87 | 31.2 | 235 | 14.7 |
| 4 | 300 | 0.80 | 28.0 | 233 | 13.1 |
| 5 | 310 | 0.74 | 23.5 | 234 | 12.0 |
| 6 | 320 | — | 27.6 | 225 | 11.5 |
| 7 | 310 | — | 24.1 | 215 | 10.4 |
| C-1 | 330 | 1.20 | 9.8 | 222 | 4.4 |
| C-2 | 330 | — | 13.5 | 210 | 6.6 |
| C-3 | 320 | — | 18.4 | 191 | 5.8 |

The polyesters of our invention also exhibit excellent resistance to solvents and chemicals. Molded bars are substantially unaffected after exposure for 24 hours in a variety of solvents and chemicals such as toluene, methylene chloride, 1,2-dichloroethane, acetone, 3-methyl-2-butanone, acetic acid, ethyl acetate, ethanol, water, 50/50 water/ethanol, benzyl alcohol, sulfuric acid, nitric acid, 10 percent aqueous sodium hydroxide, gasoline and 5% laundry bleach (Clorox).

Our novel polyesters may be blended or compounded with a wide variety of other polymeric materials to provide molding and extrusion compositions useful in the manufacture of articles having a desirable combination of properties. For example, such compositions may contain about 10 to 90 weight percent of one of our novel polyesters and about 90 to 10 weight percent of one or more other polymeric materials. Suitable polymeric materials include nylon 6,6 poly(etherimides) such as Ultem poly(ether-imide) available from General Electric, poly(phenylene oxides) such as poly(2,6-dimethylphenyl oxide) and poly(phenylene oxide), poly(phenylene oxide)/polystyrene blends such as Noryl resins available from General Electric, polyesters, poly(phenylene sulfides), poly(phenylene sulfide/sulfones), poly(ester-carbonates), polycarbonates such as Lexan polycarbonate available from General Electric, polysulfones, poly(ethersulfones) such as those derived from the aromatic dihydroxy compounds disclosed in U.S. Pat. Nos. 3,030,335 and 3,317,466.

The polyesters of this invention and blends thereof with other polymeric materials may contain additives commonly employed in polymers including flame retardants such as phosphorus, halogen compounds and halogen compounds in combination with antimony compounds, pigments, stabilizers, fillers such as talc and mica, and reinforcing agents such as glass fiber, Kevlar aramid [poly(p-phenylene terephthalamide)] fibers and carbon fiber.

The invention has been described in detail with particular reference to preferred embodiments thereof, but it will be understood that variations and modifications can be effected within the spirit and scope of the invention.

We claim:

1. A polyester having an inherent viscosity of at least 0.6 dl/g determined at 25° C. using 0.1 g of polyester per 100 mL of a solvent consisting of 25 parts by weight phenol, 35 parts by weight tetrachloroethane and 40 parts by weight p-chlorophenol and containing the following components:

A. dicarboxylic acid residues consisting of at least 80 mole percent of residues having the structure:

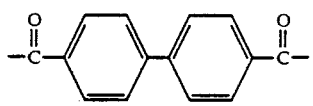

B. diol residues consisting of at least 90 mole percent of residues having the structure:
   (1) —OCH₂CH₂O— and
   (2) —OCH₂CH₂CH₂CH₂O— and, optionally,
   C. dicarboxylic acid and/or diol residues other than components A and B;

wherein the mole ratio of components B(1):B(2) is about 3:1 to 0.45:1.

2. A polyester according to claim 1 having an inherent viscosity of at least 0.8 dl/g and wherein the mole ratio of components B(1):B(2) is about 3:1 to 1.5:1.

3. A polyester according to claim 1 having an inherent viscosity of at least 0.8 dl/g, wherein component C is selected from residues of terephthalic acid, isophthalic acid, 2,6-naphthalenedicarboxylic acid, trans-4,4'-stilbenedicarboxylic acid, alkylene glycols containing 3 to about 8 carbon atoms, 1,4-cyclohexanedimethanol, p-xylylene glycol or mixtures thereof and the mole ratio of components B(1):B(2) is about 3:1 to 1.5:1.

4. A polyester having an inherent viscosity of at least 0.8 dl/g determined at 25° C. using 0.1 g of polyester per 100 mL of a solvent consisting of 25 parts by weight phenol, 35 parts by weight tetrachloroethane and 40 parts by weight p-chlorophenol and containing the following components:

A. dicarboxylic acid residues consisting at least 90 mole percent of residues having the structure:

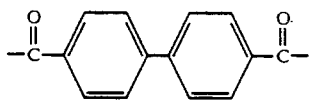

B. diol residues consisting of at least 90 mole percent of residues having the structure:
   (1) —OCH₂CH₂O— and
   (2) —OCH₂CH₂CH₂CH₂O— and, optionally,
   C. dicarboxylic acid and/or diol residues other than components A and B;

wherein the mole ratio of components B(1):B(2) is about 3:1 to 1.5:1.

5. A polyester according to claim 4 wherein component C is selected from residues of terephthalic acid, isophthalic acid, 2,6-naphthalenedicarboxylic acid, trans-4,4'-stilbenedicarboxylic acid, alkylene glycols containing 3 to about 8 carbon atoms, 1,4-cyclohexanedimethanol, p-xylylene glycol or mixtures thereof.

6. A polyester having an inherent viscosity of at least 0.8 dl/g determined at 25° C. using 0.1 g of polyester per 100 mL of a solvent consisting of 25 parts by weight phenol, 35 parts by weight tetrachloroethane and 40 parts by weight p-chlorophenol and consisting essentially of the following components:

A. dicarboxylic acid residues having the structure:

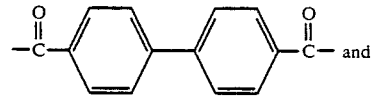 and

B. diol residues having the structure:
   (1) —OCH₂CH₂O— and
   (2) —OCH₂CH₂CH₂CH₂O—;

wherein the mole ratio of components B(1):B(2) is about 3:1 to 0.45:1.

7. A polyester according to claim 6 wherein the mole ratio of components B(1):B(2) is about 3:1 to 1.5:1.

8. A shaped article of the polyester of claim 1.

9. An article according to claim 8 wherein the shaped article is a container.

10. An article according to claim 8 wherein the shaped article is a fiber.

11. An article according to claim 8 wherein the shaped article is a film.

12. An article according to claim 8 which has been formed by injection-molding.

13. An article according to claim 8 which has been formed by compression-molding.

14. A shaped article of the polyester of claim 6.

15. An article according to claim 14 which has been formed by injection-molding.

16. An article according to claim 14 which has been formed by compression-molding.

17. The polyester of claim 1 containing a reinforcing amount of glass fiber, poly(p-phenylene terephthalamide) fiber or carbon fiber.

* * * * *